(12) United States Patent
Veneruso

(10) Patent No.: US 10,179,649 B2
(45) Date of Patent: Jan. 15, 2019

(54) DISPLACEMENT SYSTEM OF THE SIDE OF A SEAT, IN PARTICULAR AIRPLANE SEAT

(71) Applicant: GEVEN S.P.A., Nola (IT)

(72) Inventor: Getullio Veneruso, Nola (IT)

(73) Assignee: GEVEN S.P.A., Nola (IT)

( * ) Notice: Subject to any disclaimer, the term of this patent is extended or adjusted under 35 U.S.C. 154(b) by 85 days.

(21) Appl. No.: 15/302,559

(22) PCT Filed: Apr. 8, 2015

(86) PCT No.: PCT/IT2015/000103
§ 371 (c)(1),
(2) Date: Oct. 7, 2016

(87) PCT Pub. No.: WO2015/155797
PCT Pub. Date: Oct. 15, 2015

(65) Prior Publication Data
US 2017/0029119 A1   Feb. 2, 2017

(30) Foreign Application Priority Data
Apr. 8, 2014  (IT) .............. RM2014A0188

(51) Int. Cl.
*A47C 17/04* (2006.01)
*B64D 11/06* (2006.01)
*A47C 17/16* (2006.01)

(52) U.S. Cl.
CPC .......... *B64D 11/0641* (2014.12); *B64D 11/06* (2013.01); *A47C 17/04* (2013.01); *A47C 17/16* (2013.01)

(58) Field of Classification Search
CPC ..... B64D 11/0641; B64D 11/06; A47C 17/04; A47C 17/16
(Continued)

(56) References Cited

U.S. PATENT DOCUMENTS 2,019,266 A * 10/1935 Meilves ............... A47C 17/17
  297/354.13
5,788,183 A *  8/1998 Marechal ............. B60N 2/34
  244/118.6
(Continued)

FOREIGN PATENT DOCUMENTS

GB       2454751 A      5/2009

OTHER PUBLICATIONS

International Search Report and Opinion dated Sep. 2, 2015 in corresponding Application No. PCT/IT2015/000103; 9 pgs.
(Continued)

*Primary Examiner* — Syed A Islam
(74) *Attorney, Agent, or Firm* — Maier & Maier, PLLC

(57) ABSTRACT

The present invention relates to a displacement system of at least a side of a seat, in particular airplane seat, said seat comprising at least a support structure and a structure movable with respect to said support structure and that can pass from a seating configuration to an extended or bed configuration or to a straddle configuration, and vice versa, said displacement system having pushing mans connected with said movable structure of said seat and in that it is realised in such a way that, when said movable structure of said seat is in the straddle configuration, said pushing means pass from an engaged position, wherein they are engaged with said side acting on the same so as to follow the configuration and/or the movement of said seat.

6 Claims, 4 Drawing Sheets

(58) Field of Classification Search
USPC ................ 297/344.1–344.15, 354.13, 63–65
See application file for complete search history.

(56) References Cited

U.S. PATENT DOCUMENTS

| | | | |
|---|---|---|---|
| 6,726,279 B1* | 4/2004 | Figel ...................... | A61G 5/006 297/340 |
| 8,419,123 B2* | 4/2013 | Hankinson ............. | B64D 11/06 297/118 |
| 8,534,759 B2* | 9/2013 | De La Garza ......... | B64D 11/06 297/323 |
| 2012/0074751 A1 | 3/2012 | De La Garza et al. | |
| 2013/0241258 A1 | 9/2013 | Wallace et al. | |

OTHER PUBLICATIONS

Search report issued on the Italian priority application No. RM2014A000188 dated Jan. 12, 2015; 7 pgs.

* cited by examiner

DISPLACEMENT SYSTEM OF THE SIDE OF A SEAT, IN PARTICULAR AIRPLANE SEAT

The present invention relates to a displacement system of a side of a seat, particularly an airplane seat.

A class area higher than the standard one is provided in arrangement or layout of transportation means (e.g. Business class with respect to Economy class in passenger transportation airplanes), in said arrangements a type of is seat provided to the passengers able to take, besides the regular seated or reclined configuration, with the back in a vertical position, i.e. substantially perpendicular with respect to the seat, other configurations providing the back inclined, when the cabin configuration permits it, up to an extended configuration, wherein back is aligned with seat and, possibly, with leg rest-footrest, so as to realise a substantially continuous and flat surface on which passenger can completely lay over.

Further, in this kind of seats, performances can be provided permitting to the passenger to change his/her position or relax in such positions that, for short time periods, are more comfortable than conventional positions (normally seated, seated with inclined seat-very inclined seat, distended).

Among these performances, the "cradle" configuration is provided, i.e. when the seat S is positioned in an backward inclined position (as shown in FIG. 1) and rocking configuration, when the seat slowly and continuously moves from the cradle configuration (as again shown in FIG. 1).

This kind of airplane seats is provided with sides or armrests or lateral support elements for supporting the passenger arms that can conform to the reclined or erected position of the seat and to the bed or extended position, lowering and lifting on the basis of the needing so as to contribute to comfort of the passenger in the different positions.

Thus, a bigger space for the body is provided when he/she is in the supine position (and vice versa in the opposite run).

The above feature is generally presently obtained without the help of servomechanisms actuated by electronic systems, by simply by mechanism actuated by main transition movement of the seat.

In case the seat is further provided with e motion system permitting taking the "cradle" position, the problem arises to permit to the passenger the normal use of said sides-armrests even when the seat takes said position.

In fact, mechanisms permitting the vertical lowering and lifting movement, and vice versa, of the sides-armrest, without the help of servomechanisms assisted by suitably programmed electronic systems, are based on leverage or cam systems, or other systems, connected within the main seat motion (transition).

However, said systems cannot discriminate if transition movement, which is mainly longitudinal, is associated to the passage from seated position to bed position, or vice versa, or from seated position, or from bed position, to cradle position, and vice versa.

By said systems it is not possible obtaining that sides-armrests lowering and lifting during transition from normal or retracted or seated position to the bed or extended position, also rise and lower during "cradle" position, so as to ensure in this condition enjoying the armrest at the proper height.

Therefore, it is an object of the present invention that of obtaining a displacement system of sides of a seat for transportation means, particularly for airplanes, able to follow attitude or configuration of the seat, thus ensuring comfort to the passenger seated on the same seat.

Further, object of the invention is that obtaining a displacement system that is not particularly complex, and not requiring complicated electronic control systems.

It is object of the present invention a displacement system of at least a side of a seat, in particular airplane seat, said seat comprising at least a support structure and a structure movable with respect to said support structure and that can pass from a seating configuration to an extended or bed configuration or to a straddle configuration, and vice versa, said displacement system being characterized in comprising pushing means, connected with said movable structure of said seat and in that it is realised in such a way that, when said movable structure of said seat is in the straddle configuration, said pushing means pass from an engaged position, wherein they are engaged with said side acting on the same so as to follow the configuration and/or the movement of said seat.

Particularly, according to the invention, said displacement system can comprise a hinge between said pushing means and said movable structure and return means acting on said pushing means in a position disengaged with respect to said side.

More particularly, said displacement system can further comprise a contact element rigidly coupled with said pushing means, and a ramp element, rigidly coupled with said support structure, and that can be realised in such a way that, when said movable structure makes a translation movement toward the cradle configuration, said contact element contact said ramp element, thus causing rotation of said pushing means with respect to said hinge from the disengagement position with respect to said side.

Still according to the invention, said ramp element can be provided in the rear portion of said support structure and said movable structure can move toward the rear part of said support structure, said contact element (10) contact said ramp element.

Always according to the invention, said pushing means can comprise two rolls that can contact the lower surface of said side.

Furthermore, according to the invention, said displacement system can comprise a lowering-lifting system of said sides connected with said movable structure of said seat by connection means.

Preferably, according to the invention, said connection means can comprise an articulated finger constrained in rotation with a first end of said lowering-lifting system of said sides and constrained in rotation in a second end (with said side and opposition means acting on said articulated finger in a first position, and realized in such a way that when said seat passes to said cradle configuration, said articulated finger rotates about said constraint points.

Finally, according to the invention, said lowering-lifting system of said sides can comprise a sliding guide and a rolling element, that can slide along said guide and connected by said connection means with said movable structure and said side.

The invention will be now described, for illustrative, but not limitative purposes, with particular reference to the drawings of the enclosed figures, wherein.

Figure 1:
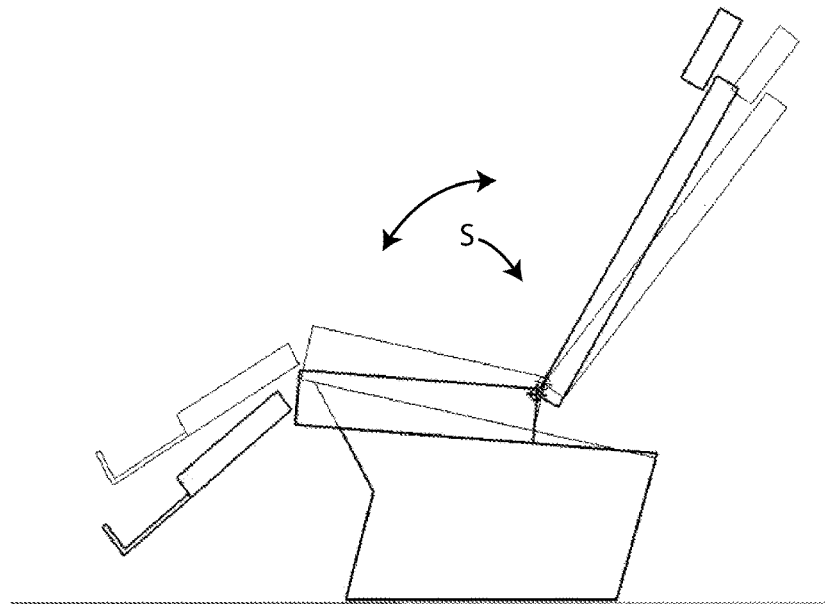
FIG. 1 shows a lateral view of a seat in a "cradle" position and with a rocking movement.
Figure 2:
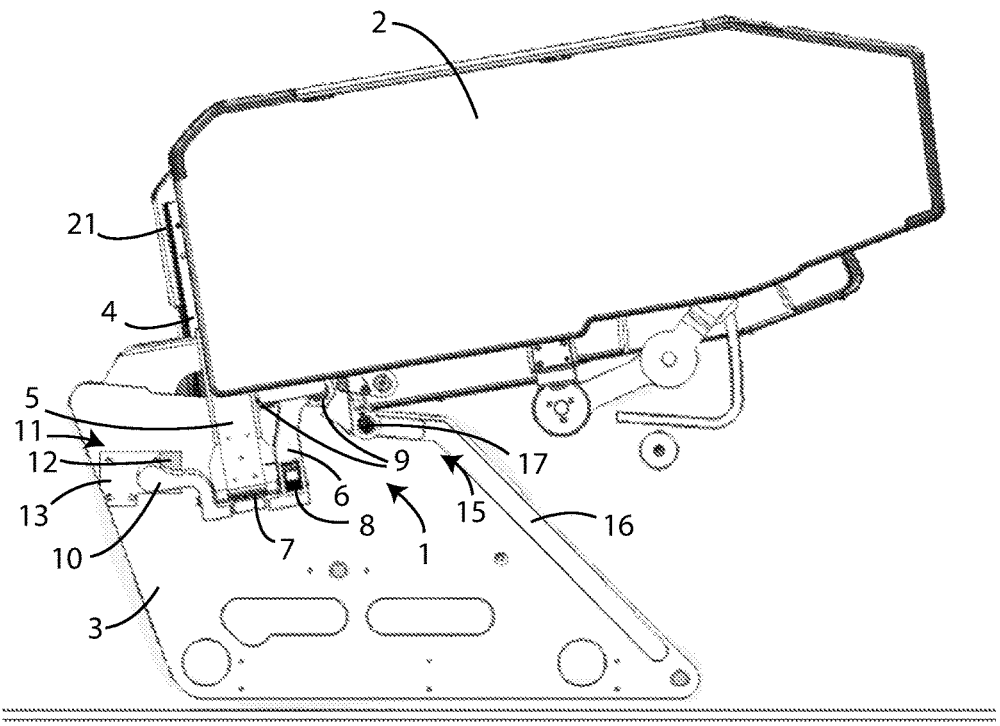
FIG. 2 shows a lateral view of the displacement system for sides according to the invention.

Making reference to FIGS. 2-5, it is observed a displacement system of sides 2 of a transportation vehicle passenger seat (not shown), preferably for airplanes, indicated by reference number 1.

Obviously, the same type of seat, in its different configurations, could be eventually adapted to railway or naval or bus uses for long distance transportation, or even not necessarily for transportation use, e.g. it can be used in a cinema, or in airport, stations or stadium lounges.

A seat able to take different positions (reclined, bed, cradle) generally comprises a fixed support structure 3, and a structure 4 movable with respect to said support structure 3 and able to take different positions, as already said in the above.

In the present patent application, reference will be made to the rear part of the seat, namely to the seat part close to the back, and to the front part of the seat, namely to the seat part close to the seat most remote part from said back.

Movable structure 4 of the seat includes an arm 5, extending outside and laterally with respect to the support structure 3.

Two sides of the seat are respectively provided in correspondence of the two lateral parts of the seat. Only one side will be described in this patent application, but it well evident that the same system can be associated to both sides.

Displacement system 1 according to the invention comprises a lifting-pushing element 6 connected to the main movable part 4 of the seat by said arm 5, to which it is constrained in rotation about a hinge 7, on which return means 8 act, particularly a spring, maintaining said lifting-pushing element 6 in a rest or disengaged position with respect to said side 2.

Said lifting-pushing element 6 further comprises contacting and pushing means 9, particularly two rolls 9, provided at the opposite end of the lifting-pushing element 6 with respect to said hinge 7.

Said displacement system 1 further comprises a sphere contact element, rigidly coupled with said lifting-pushing element 6, and a ramp element 11, rigidly coupled with said seat support structure 3.

Said ramp element 11 comprises a ramp portion 12, directly connected with a surface 13 parallel with respect to said support structure 3, on which said sphere contact element 10 can slide.

Figure 5:
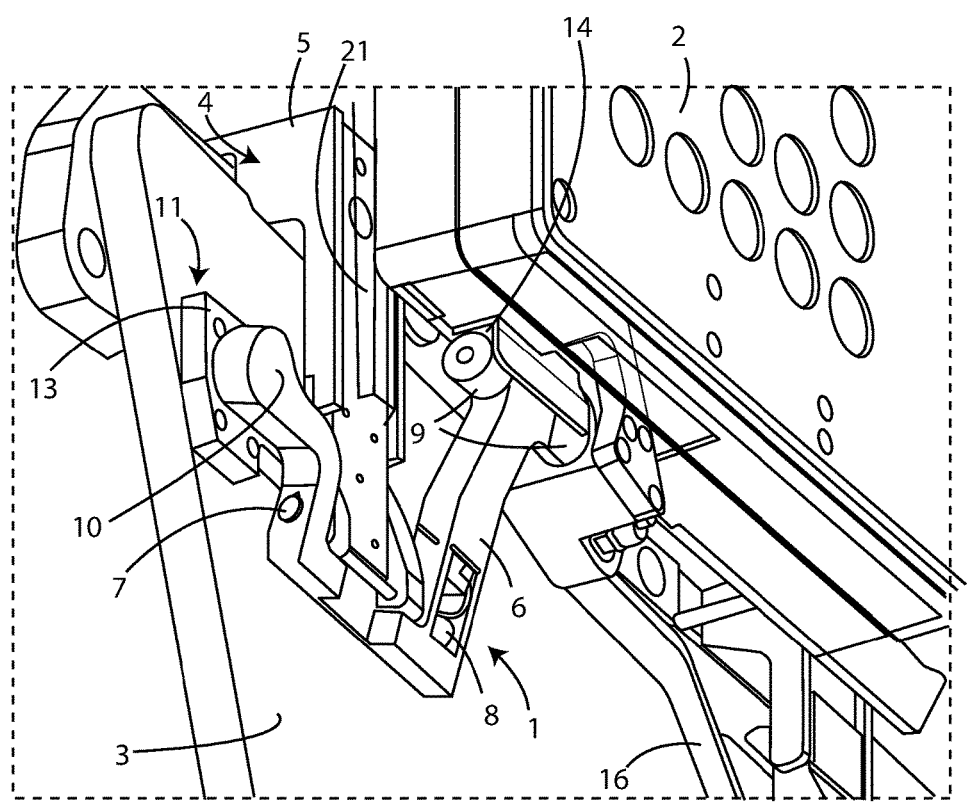
FIG. 5 shows a bottom perspective view of a particular of the displacement system of FIG. 2 in an engaged position.

Therefore, when the movable part 4 of the seat is moved into the cradle position, thus involving positioning of the seat movable part 4 toward rear part of the support structure 3, also pushing element 6 and contact element 10, rigidly coupled each other, move backward toward rear part of the seat toward ramp element 11, thus causing advancement of contact element 10 above ramp element 12, by said sphere, and then on surface 13, thus causing rotation of lifting-pushing element 6 with respect to said hinge 7, passing from rest position (see FIG. 4) to an operative position (see FIG. 5), in which contact and pushing means 9 are displaced outside said support structure 3 and are in correspondence of the lower surface 14 of the side 2, engaging with the same, as shown in FIG. 5.

When movable part 4 of the seat is further displaced to take the cradle or rocking position, pushing element 6 acts, bys said contact and pushing means 9, on said lower surface 14 of the side 2, so that also side-armrest follows cradle or rocking movement, thus yielding and advantageous comfort for the passenger seated on the seat.

Figure 3:
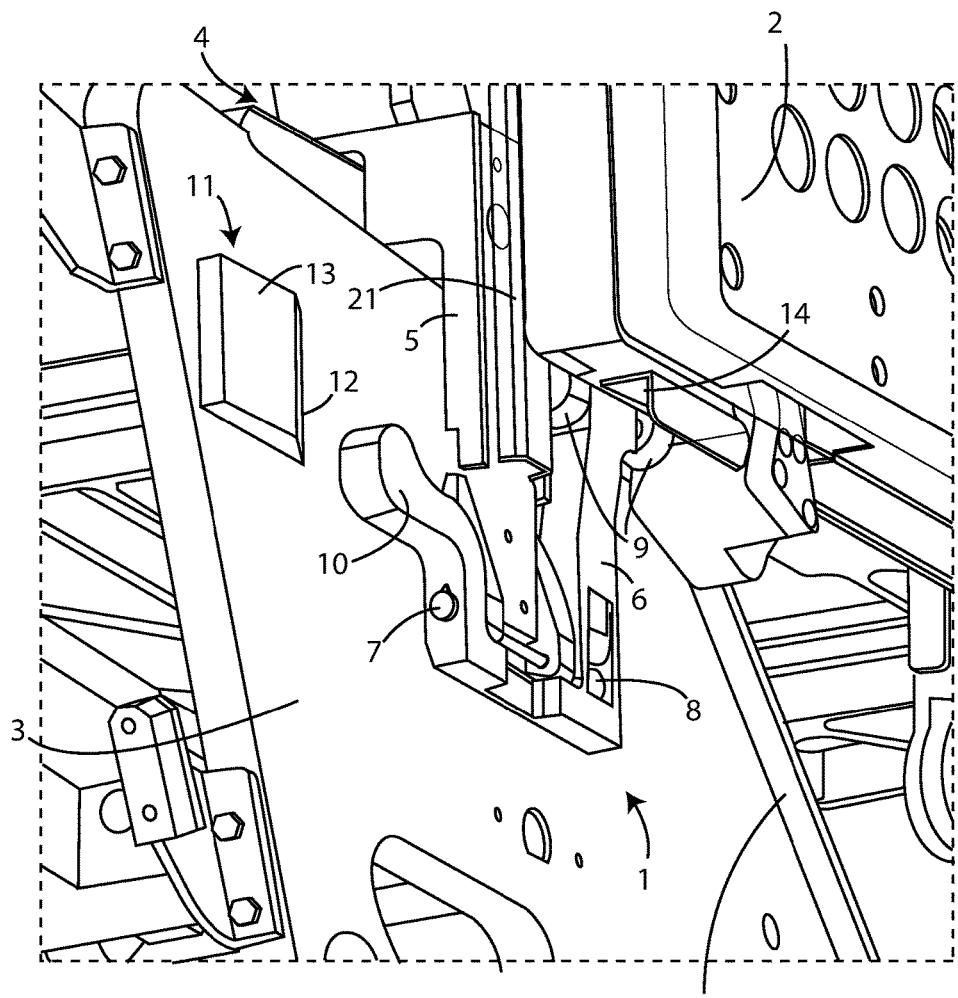
FIG. 3 shows a perspective view from the bottom of a particular displacement system of FIG. 2 in a disengagement position.
Figure 4:
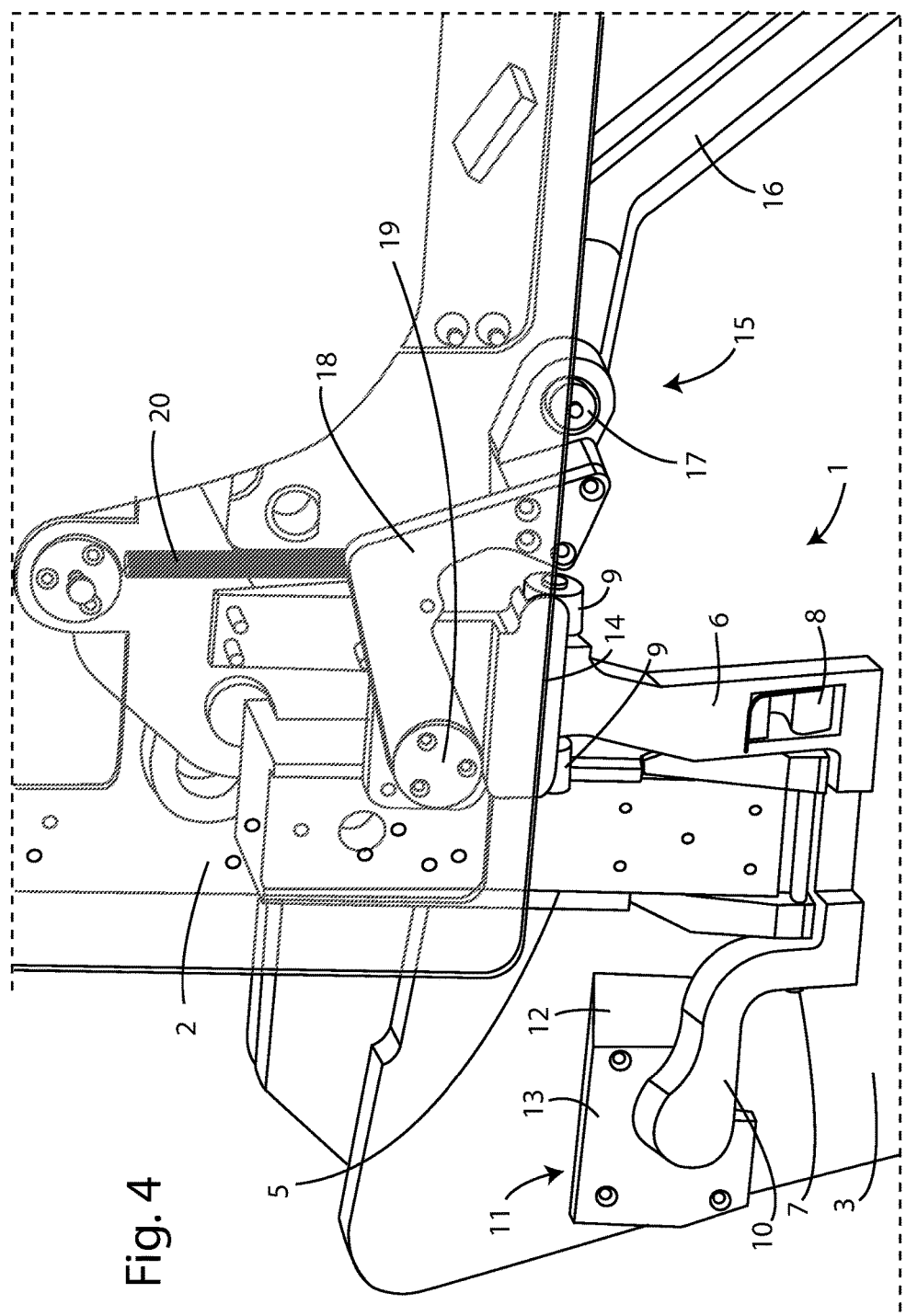
FIG. 4 shows a lateral perspective view of a particular displacement system of FIG. 2.

Once the movable part 4 is brought back in the normal seating position, i.e. no more in the cradle position, and seat movable structure 4 is displaced toward the front part of the seat, by said arm 5, sphere element 10 too is dragged toward front part of the support structure 3, descending from ramp 12 and, pushed by return means 8, being in the starting rest position, wherein sphere of the contacting element 10 is contacting the support structure 3 surface (as shown in FIG. 3), bringing back the pushing element 6 far from lower surface 15 of the side 2, thus disengaging from the same.

Said displacement system according to the invention can operate independently from the lifting-lowering movement of sides or it can operate in synergy with the same.

In the specific embodiment shown in the figures (and particularly in FIGS. 2 and 4), displacement system 1 of sides 2 according to the invention further comprises a cam system 15 including a guide or track 16, realised in the support structure 3 of the seat and a rolling element 17, sliding within said guide 16, and coupled by coupling means 17, such as telescopic guides 17, with the main movable part 4 of the seat, in order to permit vertical upward-downward movement, and vice versa, of sides 2.

In order to connect vertical movement of sides 2 with cradle movement of sides 2, as described in the above, said displacement system 1, in the described embodiment, further comprises an articulated finger 18, having one end rigidly coupled with said rotating element 17 and one end constrained in rotation to said side 2 by a hinge 19, and elastic means 20 acting on said finger 19 in order to maintain a first working position.

When the seat takes the cradle position, lifting-pushing element 6 engages with the lower surface 14 of side-armrest 2, acting on the same, as described in the above. Thus, finger 18 is obliged to rotate, opposing to the elastic means 20, about hinge 19 provided in side-armrest 2, not opposing to the rotation-translation movement of said side-armrest 2 when in the cradle position.

The solution described in the above advantageously permits synergistically combining cradle movement and lowering-lifting movement of sides, accompanying the relative displacement of the seat to reach an optimum passenger comfort.

Further, displacement system according to the invention is mechanically simple, not requiring complicated control electronic systems.

In the above, Preferred embodiments have been described, and variations have been suggested, of the present invention, but it is to be understood that those skilled in the art can introduce modifications and changes without departing from the relevant scope, as defined in the enclosed claims.

The invention claimed is:

1. Displacement system of at least a side of a seat, in particular airplane seat, comprising:
at least a support structure and a movable structure with respect to said support structure that can pass from a seating configuration to an extended or bed configuration or to a straddle configuration, and vice versa, said displacement system further comprising pushing means connected with said movable structure of said seat and when said movable structure of said seat is in the straddle configuration, said pushing means pass from an engaged position, wherein they are engaged with said side acting on the same so as to follow the configuration and/or the movement of said seat, a hinge between said pushing means and said movable structure and return means acting on said pushing means in a position disengaged with respect to said side, and a contact element rigidly coupled with said pushing means, and a ramp element, rigidly coupled with said support structure, and when said movable structure makes a translation movement toward the cradle configuration, said contact element contacts said ramp element, thus causing rotation of said pushing means with respect to said hinge from the disengagement position with respect to said side.

2. Displacement system according to claim 1, wherein said ramp element is provided in a rear portion of said support structure and in that said movable structure moves toward the rear part of said support structure, said contact element contacts said ramp element.

3. Displacement system according to claim 1, wherein said pushing means comprise two rolls that can contact the lower surface of said side.

4. Displacement system according to claim 1, further comprising a lowering —lifting system of said sides connected with said movable structure of said seat by an articulated finger.

5. Displacement system according to claim 4, wherein said articulated finger constrained in rotation with a first end of said lowering —lifting system of said sides and constrained in rotation in a second end with said side and an elastic means acting on said articulated finger in a first position, and realized in such a way that when said seat passes to said cradle configuration, said articulated finger rotates about at least one of said first end and said second end.

6. Displacement system according to claim 4, wherein said lowering—lifting system of said sides comprises a sliding guide and a rolling element, that can slide along said guide and connected by said articulated finger with said movable structure and said side.

* * * * *